US008825657B2

(12) United States Patent
Attaran Rezaei et al.

(10) Patent No.: US 8,825,657 B2
(45) Date of Patent: Sep. 2, 2014

(54) SYSTEMS AND METHODS FOR CREATING, NAVIGATING, AND SEARCHING INFORMATIONAL WEB NEIGHBORHOODS

(75) Inventors: Behnam Attaran Rezaei, Los Angeles, CA (US); Alice Hwei-Yuan Meng Muntz, Pacific Palisades, CA (US)

(73) Assignee: Netseer, Inc., Santa Clara, CA (US)

( * ) Notice: Subject to any disclaimer, the term of this patent is extended or adjusted under 35 U.S.C. 154(b) by 0 days.

(21) Appl. No.: 11/625,279

(22) Filed: Jan. 19, 2007

(65) Prior Publication Data
US 2007/0245035 A1    Oct. 18, 2007

Related U.S. Application Data

(60) Provisional application No. 60/761,011, filed on Jan. 19, 2006.

(51) Int. Cl.
*G06F 17/30* (2006.01)
*G06F 7/00* (2006.01)

(52) U.S. Cl.
CPC ...... *G06F 17/3089* (2013.01); *G06F 17/30958* (2013.01)
USPC .......................................... 707/738; 707/755

(58) Field of Classification Search
CPC ....................... G06F 17/3089; G06F 17/30958
USPC .......................................... 707/777, 999.102
See application file for complete search history.

(56) References Cited

U.S. PATENT DOCUMENTS

| | | | |
|---|---|---|---|
| 6,038,560 A | 3/2000 | Wical | |
| 6,233,575 B1 | 5/2001 | Agrawal et al. | |
| 6,446,061 B1 * | 9/2002 | Doerre et al. | 1/1 |
| 6,549,896 B1 * | 4/2003 | Candan et al. | 1/1 |
| 6,665,837 B1 * | 12/2003 | Dean et al. | 715/234 |
| 6,886,129 B1 * | 4/2005 | Raghavan et al. | 715/205 |
| 7,051,023 B2 | 5/2006 | Kapur et al. | |
| 2003/0217139 A1 | 11/2003 | Burbeck et al. | |
| 2003/0217140 A1 | 11/2003 | Burbeck et al. | |
| 2003/0220866 A1 | 11/2003 | Pisaris-Henderson et al. | |
| 2004/0064438 A1 * | 4/2004 | Kostoff | 707/1 |
| 2004/0093328 A1 | 5/2004 | Damle | |
| 2005/0021531 A1 * | 1/2005 | Wen et al. | 707/100 |
| 2005/0160107 A1 | 7/2005 | Liang | |

(Continued)

OTHER PUBLICATIONS

Roychowdhury et al., Scalable Percolation Search in Power Law Networks, Jun. 2004, Department of Electrical Engineering, University of California, Los Angeles, pp. 1-13.*

(Continued)

*Primary Examiner* — Michael Hicks
(74) *Attorney, Agent, or Firm* — Nixon Peabody LLP (57) ABSTRACT

Systems and methods are described for the creation of hierarchical networks of overlapping informational Web neighborhoods, where each neighborhood comprises a set of closely linked pages that share a common set of concepts and intent and purpose. A general description of a category of information can be used to generate a network of overlapping communities of web pages and objects, where the neighborhoods represent pages or objects that share a common set of underlying concepts and semantic associations. Each such neighborhood can be semantically tagged. Overlaps among neighborhoods and the hierarchical structure of the network capture complex relationships among the concepts that the corresponding informational neighborhoods represent. All informational neighborhoods of the web can be mapped. The systems and methods can be adapted for any digital content and constitute a hybrid network of contents and their relationships.

47 Claims, 3 Drawing Sheets

Domain-specific web neighborhood determination methodology

Context finding methodology in information web neighborhood without seed information (56) References Cited

U.S. PATENT DOCUMENTS

2005/0210027 A1* 9/2005 Aggarwal et al. ............. 707/6
2006/0271564 A1* 11/2006 Meng Muntz et al. ....... 707/100
2006/0294155 A1 12/2006 Patterson

OTHER PUBLICATIONS

Weikum et al., "Towards Self-Organizing Query Routing and Processing for Peer-to-Peer Web Search", DELIS-TR-0287, 2005.*

Chao et al., "Tag Mechanisms Evaluated for Coordination in Open Multi-Agent Systems", ESAW 2007, LNAI 4995, pp. 254-269, 2008, Springer-Verlag Berlin Heidelberg.*

Calado et al., Combining Link-Based and Content-Based Methods for Web Document Classifications, CIKM'03, pp. 394-401, ACM, 2003.*

International Search Report for PCT Application No. PCT/US2007/001694 dated Feb. 14, 2008.

* cited by examiner

Domain-specific web neighborhood determination methodology

Context finding methodology in information web
neighborhood without seed information

Figure 3

SYSTEMS AND METHODS FOR CREATING, NAVIGATING, AND SEARCHING INFORMATIONAL WEB NEIGHBORHOODS

CROSS-REFERENCE TO RELATED APPLICATIONS

The present application claims benefit of priority from U.S. Provisional Patent Application Ser. No. 60/761,011 titled "Method And Apparatus for Creating, Navigating, and Searching Informational Web Neighborhoods" and filed Jan. 19, 2006, the contents of which are incorporated herein by reference and for all purposes.

BACKGROUND OF THE INVENTION

1. Field of the Invention

The present invention relates generally to methods for analyzing relational systems where nodes have local interactions or links, and more particularly to methods for analyzing linked databases.

2. Description of Related Art

The World Wide Web comprises a heterogeneous complex network with potentially billions of nodes and edges that link these nodes or URLs together. The large-scale, time-varying, heterogeneous and unstructured nature of the web, make it a very difficult database from which to extract meaningful and desired information. The web does share a few similarities with conventional linked databases. Conventional linked databases can also be represented as a network comprising different classes of objects that can be characterized as nodes, whereas, in the case of the web, nodes are URLs or specific web sites. Conventional linked databases also include links connecting nodes and relationships among objects of linked databases may be regarded as equivalent to the hyperlinks of the web which are used to link to other web sites. However, the web is very noisy and lacks accurate annotation, which makes its exploration particularly difficult. In a conventional linked database, the nodes as well as the edges are annotated with meta-information, which describe various attributes of both the objects and the nature of their relationships. For example, for an edge or link, such meta-information might include a description of the underlying relationship (e.g., father, son, wife, girl friend, partner etc.) and its strength (e.g., frequency of contacts), time stamps describing when such a relationship was established, and, if applicable, when it is set to expire, and perhaps even geographical location of the relationship. In the case of web, however, such annotation for the nodes and links are lacking cannot be easily inferred. A web page might link to another page for a variety of reasons that cannot be always deduced from the content of the web page itself. Similarly, while it is relatively easy to identify the purpose of certain web pages (for example, a manufacturer of a particular product or a corporation usually has a well-organized web page that clearly states its products and services, partners, management team, location etc.) and create an accurate annotation, an accurate determination of its purpose, objectives, and relevance has proven to be a difficult task to accomplish for most web pages. Often, the relevance of both the content of a page, as well as its links, depends on the type of information that one is interested in. Thus, while the web is a networked information system comprising nodes and links, it has proven to be a very difficult problem to accurately extract meta-information for the nodes and edges, and it remains a difficult system to infer relevant information from.

Most existing search engines deal with this challenging task of organizing and extracting information from the web by performing three critical tasks: (i) crawling the whole web, (ii) indexing the content of each page by making a list of words and terms that appear in each page along with a relevance index (e.g., where in the text the words appear and in what font size), and (iii) calculating the relevancy, trustworthiness, or the importance of a given page, as determined by the link structure of the web. These tasks yield a measurement known as the page rank. Page rank attempts to determine how many "important" pages link to a given page, where importance or "page rank" is computed in a self-consistent manner. Thus, for a page to have a high rank, a lot of pages with relatively high rank must link to it. These steps allow search engines to support Boolean searches. All pages that match a query are returned as part of a list, which is sorted based on their page rank, and the strength or relevancy with which the key words in the query appear in the page. Sometimes, engines use fees paid by the owner of a page to determine its location in the sorted list if the query involves commercial products. If a user wants further information, then the user must look up a number of these pages, formulate hypotheses about what is important, and navigate the web by trial and error. For example, a query directed to a company's web presence, in the sense of what types of individuals and news organizations are reporting on the company and who they represent, and if they are relevant or important to the company, then there are no easy key words to get this information; an exhaustive search may be required with different key words followed by much manual post-processing in order to infer such information. Even then, only those individuals or organizations having directly reported on the company may be discovered, and it may be difficult to find other individuals and organizations that are closely related to these direct reporters. Such information is embedded in the underlying network but not accessible via key-words-based searches.

Conventional search engine technologies support keywords based search capability, where all web pages satisfying a Boolean query are returned as a sorted list. The list is sorted according to a relevancy score, which, in turn, is computed by combining a number of relevancy factors, including the page rank of a page as determined from the global link structure of the web, the relevancy with which the key words are present in the page, and based on an amount the related company is willing to pay for its page to be included at the top of the list. This list could be very long and is identical for the same set of key words and for all users. A user usually must explore this list by trial and error, and such exploration is complicated because the user often has only a vague idea of what is being sought.

Conventional search engines flatten the web of relationships, and convert the underlying complex network to one-dimensional lists. Relevancies of different documents are determined by the search engine in a linear fashion, and the search results are not organized in a fashion to make further explorations more meaningful. All users with the same key-words receive the same set of documents, and any feedback from the user is in the form of trial and error, and via modifications of Boolean expressions.

Recently, attempts have been made to devise methods for returning pages that are "relevant" to a particular page requested by a user, or for returning pages that are relevant to a query. In order to determine such relevant pages and compute their relevancies, these methods use a combination of page rank and semantic similarities. For example, the exact neighborhood network (n-network) of a relevant page is processed in an attempt to identify pages that are semantically similar in content to the initial page. The primary limitations of these systems include: (i) the n-network of a node can easily become too large to be fetched and processed in a meaningful way, thus restricting the exploration of pages to those that are at most 2 or 3 hops away from the initial node; (ii) the so-called "important" nodes in these networks are determined by an analysis of their degrees, which could be very misleading when it comes to the relevance of a page to the original query; and (iii) there is no reason for all these pages in the n-network to have a common semantic theme, making the processing of contents of these pages difficult and prone to errors. These methods provide incremental extensions of the predominant existing method for organizing information from the web. Such methods provide linear search results, and reduce the complexity of the web by representing it in terms of tables and linear lists. Hence, there is a need for methods to obtain a networked representation of the web that captures the complex informational relationships among the pages, and organizes the information content of a page with respect to the contents of other related web pages.

BRIEF SUMMARY OF THE INVENTION

Certain embodiments of the invention, methods are provided that extract structural communities that are relevant to, or closely associated with the general concepts provided at the outset. The structural communities can include clusters of pages that are strongly connected to each other by hyperlinks. In certain embodiments, content may be partitioned into clusters or contexts automatically and statistically significant concepts may be generated for each context and cluster. Moreover, a generally hierarchical neighborhood structure can be determined, where higher-level neighborhoods can be subdivided into finer-grained sub-communities. Membership of pages in a shared structural community may provide contexts within which the contents of these pages can be interpreted and semantically processed.

In certain embodiments, specialized webs can be created. For instance, a business web can be created from a starting point of a general description of particular business sectors, including major companies in the sector, names of retailers, related technologies, etc. Descriptive lists can serve as initial seed information and can be obtained from a variety of sources. In certain embodiments, a multi-resolution and multi-dimensional network of informational neighborhoods can be created, wherein each neighborhood comprises one or more desired business related entities. In certain embodiments, the process can be repeated iteratively to obtain a hierarchical multi-resolution structure and network. In certain embodiments, such processes can be employed to construct different types of webs, including financial, music, entertainment and sports webs.

Certain embodiments provide a multi-resolution and multi-dimensional informational search tool for the web and may enable informational exploration of the web. A user can provide a set of seed information, comprising key words, initial links, and names of related objects or organizations. This seed information can be processed to generate a set of seed nodes around which the informational neighborhoods are formed and expanded. In certain embodiments, a multi-resolution and multi-dimensional network of communities of web pages may be returned whereby each community can be labeled with a set of words and concepts and can be embedded in a hierarchical structure. In certain embodiments, the informational landscape can be further explored by the user, thereby putting the user in charge of the search process. In certain embodiments, searches performed by individuals can be accumulated and integrated into a common database, so that the informational neighborhoods derived from each query can be used to generate a cumulative informational web neighborhood.

In certain embodiments, the whole web can be partitioned into multi-scale and hierarchical sets of overlapping contexts and communities. In some of these embodiments, a combination of percolation crawl and structured community finding algorithms is employed for such partitioning. Communities and contexts can be indexed, and concepts can be automatically extracted. In certain embodiments, communities and contents may be inverse indexed such that a key word or a concept can be assigned and an inverted index returns all communities and contents, typically sorted according to relevance scores. In certain embodiments, this search may return a rendition of the web in terms of contexts.

Certain embodiments identify and analyze temporal dynamics of the relationships among objects and concepts represented in the informational web neighborhoods. By analyzing the archived webs, informational neighborhoods can be derived at different times and compared to determine whether significant changes have occurred. Such dynamical analyses can provide both predictive tools for estimating likelihoods of impending shifts in the structure of certain sectors, as well as, investigative research tools to determine potential factors that could have led to a particular set of observed changes.

DETAILED DESCRIPTION OF THE INVENTION

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration.

Throughout this document web, and content, and node are used interchangeably and any method defined can be used on any digital content. Moreover, informational web neighborhood is used in relation to categorizing and exploring any digital content network.

Certain embodiments of the invention simultaneously exploit the link structure of web pages, and the semantic and organization structures of content of web pages to construct a multi-dimensional and multi-resolution network. For example, each community can represent a closely-knit cluster of nodes on the web, in terms of web links, and the contents of the nodes in each community can be processed to annotate them with their shared attributes and concepts.

In certain embodiments, content can be automatically partitioned into clusters and contexts, and statistically significant concepts can be generated for each context and cluster. In certain embodiments, clusters and contexts can be automatically generated without the specification of seed nodes. Certain embodiments provide a neighborhood structure that may be generally hierarchical such that a higher-level neighborhood can be subdivided into finer-grained sub-communities. In certain embodiments, contexts can be derived based on membership of pages in a shared structural community and the content of pages can be interpreted and semantically processed within the contexts.

In certain embodiments, methods are provided for extracting multi-resolution and multi-dimensional representations of the information content of web pages. Certain embodiments receive an input comprising a general description of the category of information sought, as expressed in terms of key words, important web sites, and related individuals and organizations. Based on the input, the web can be mined to generate a network of overlapping neighborhoods or communities of web pages and objects, where the neighborhoods typically represent pages or objects that share a common set of intents, purposes and associations. Each neighborhood can be semantically tagged with a set of words and concepts determined by the contents of the web pages. An initial description of the general objects and concepts can be provided as seed information. Seed information is typically associated with the informational web neighborhoods that are to be created and the seed information can be processed to determine a set of seed nodes in the web. The informational neighborhoods can be built and expanded around the seed nodes. Moreover, overlaps among the neighborhoods and the hierarchical structure of the network can capture complex relationships among the concepts represented by the corresponding informational neighborhoods. Thus, a multi-resolution and multi-dimensional networked view of the informational neighborhoods or communities embedded in the web can be obtained.

In certain embodiments, the link structure of the web pages, and the semantic and organization structures of the content of the web pages can be simultaneously exploited to construct a multi-dimensional and multi-resolution network. For example, each community may represent a closely-knit cluster of nodes on the web in terms of web links, and the contents of the nodes in each community can be processed to provide annotations that include corresponding shared attributes and concepts. Typically, structural communities are extracted that are relevant to, or closely associated with general predetermined concepts, or seed information, provided at the outset. Structural communities typically include clusters of pages that are strongly connected to each other, as indicated for example, by one or more hyperlinks. A neighborhood structure can be derived that is generally hierarchical.

Information related to membership of a page in a shared structural community can be used to provide contexts within which to interpret and semantically process the contents of the page. Possible contexts within which the content of a page is to be interpreted may be determinable from links to other pages, since these links can be expressive of intentions of an author with regard to the page. In one example, a sporting goods page dealing with golf equipment may provide links to major golf club manufacturers and leading golf players. The decision to provide such links can lead to the emergence of a community or neighborhood, having one or more different shared attributes. In the latter example, most pages in a community may be associated with sports-related products, activities or reporting. More particularly, pages in the community can possess the commonality of being tied to the sport of golf. Identification of community structures to which a page belongs can further reinforce and distill contexts used for semantic processing: i.e., pages may be assumed to be part of a shared relevant informational unit where many pages are closely knit together by, for example, their hyperlinks. A page can belong to multiple overlapping communities, allowing it to have different semantic tags.

Figure 1:
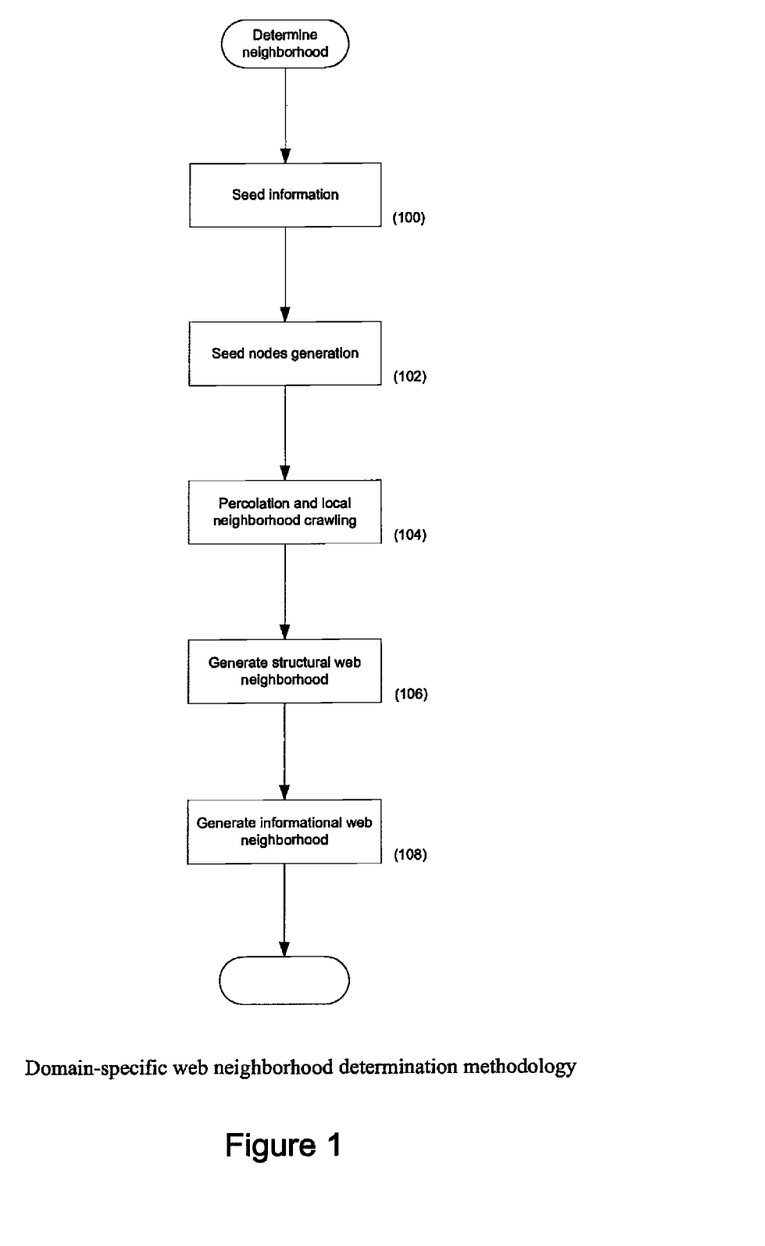
FIG. 1 is a flowchart illustrating a process for determining domain-specific web neighborhood in one embodiment of the invention.

Effective and accurate semantic processing of page contents can be challenging in the absence of contextual information such as that provided by the structural neighborhoods. However, certain embodiments provide a local method of percolation crawl and community finding that offers a scalable solution to the otherwise daunting task of finding informational neighborhoods. FIG. 1 includes a flowchart illustrating a process for determining domain-specific web neighborhood in one embodiment of the invention. At step 100, seed information may be received where the seed information delineates the scope of the web neighborhood to be determined. Seed information may take various forms, including: names of companies, individuals or organizations, names of competitors or related industries, general key words describing the field of knowledge or expertise and specific web sites identified as potentially relevant. In certain embodiments, at least some of the seed information may be derived from seed information obtained a database, website or other appropriate source of information.

At step 102, seed nodes may be generated from the seed information provided by the user. Seed information can be processed to generate a set of seed nodes that may include web pages that can serve as centers around which local community finding algorithms can be implemented. Generation of seed nodes can comprise various steps generated, including:
  (i) the performance of key word based searches using user-provided information and search engines to identify relevant sites;
  (ii) the performance off semantic analysis and indexing information, page-rank or related structural information to obtain a list of seed nodes; and
  (iii) the removal of noise by vetting intermediate lists of candidate nodes and based on feedback received from one or more users concerning the relevancy of some of these automatically generated seed nodes.

At step 104, an annotated linked network, with meta-information for nodes and edges can be constructed using percolation and local neighborhood crawling. Starting at one or more of the seed nodes, and by following reference links in and out of the seed nodes, a percolation crawl may be performed to construct networks that are most relevant to the one or more seed nodes. In at least some embodiments, a combination of percolation and deterministic crawls may be used. As new sites and nodes are accessed, semantic analysis on the content of the sites and nodes can be performed to determine its relevance to other sites and nodes and to identify the type of relevance to the other sites and nodes. In some instances, a site or node discovered to have a relevance below an expected or otherwise predetermined threshold may be discarded. Where relevance is discovered that exceeds such threshold, the site or node can be annotated using key words and other information including information associated with the node and its associated links. Additionally, links to and from the site or node can be annotated using descriptions, indicators, and other characteristics of the types of relationships between end nodes. Typically, percolation and local neighborhood crawling may be performed using customized, configured or specially-developed percolation and probabilistic crawlers.

The following discussion is provided to assist in understanding some of the differences between conventional crawlers and probabilistic crawlers as implemented in certain embodiments of the invention. Conventional deterministic web crawlers operate as follows:
 (a) Create a database D populated with pre-selected unfetched web pages,
 (b) Generate a list L of unfetched web pages in D.
 (c) Fetch each web page W from L into D. Add all those web pages to D to which W links to (outlinks). This step defines deterministic crawlers.
 (d) Assign a score to W after examining the number of existing web pages that link to it (inlinks), and
 (e) repeat steps (b)-(d).

In certain embodiments of the present invention, a probabilistic crawler randomly selects links to fetch in and out of a fetched web page. Thus, some of the links may originate in the fetched page and terminate on a page other than the fetched page (out-link) while other links may terminate on the fetched page having originated somewhere other than the fetched page (in-link). It will be appreciated that a difference between the deterministic crawler and the probabilistic crawler is that the deterministic crawler adds every out-link of a fetched page to the database, whereas a probabilistic crawler typically adds out-links probabilistically. More particularly, every out-link has an equal probability, p, of being added to the database. A probabilistic crawler may also add in-links of a given web page to the database. The in-links are chosen from a number "M" of in-links, according to a probability 'r'. The parameters, "p," "M," and "r" can be specified by the user. It will be appreciated that a probabilistic crawler can be caused to operate as a deterministic crawler by configuration and appropriate specification of these parameters.

At step 106, an annotated linked network, organized into a multi-resolution and multidimensional community structure may be produced. This structural web neighborhood can be constructed using community clustering of the crawled and annotated network. Communities discovered to have certain structural properties can be investigated and can be removed where necessary or otherwise indicated. In one example, very highly-clustered small communities often represent "noise" or content that is related to spam.

At step 108, an informational web neighborhood can be constructed. Typically, text mining tools can be used to assign a bag or set of concepts to each structural community. Any suitable or preferred text mining tool may be used, including latent semantic indexing tools and other natural language processing tools. Typically, each site and link can be associated with a set of index terms and semantic processing may be applied to these terms to obtain informational tags for the communities. Additionally, types of relationships among the communities can be annotated. Each community can be associated with multiple concept tags, each having a corresponding confidence level.

Figure 3:
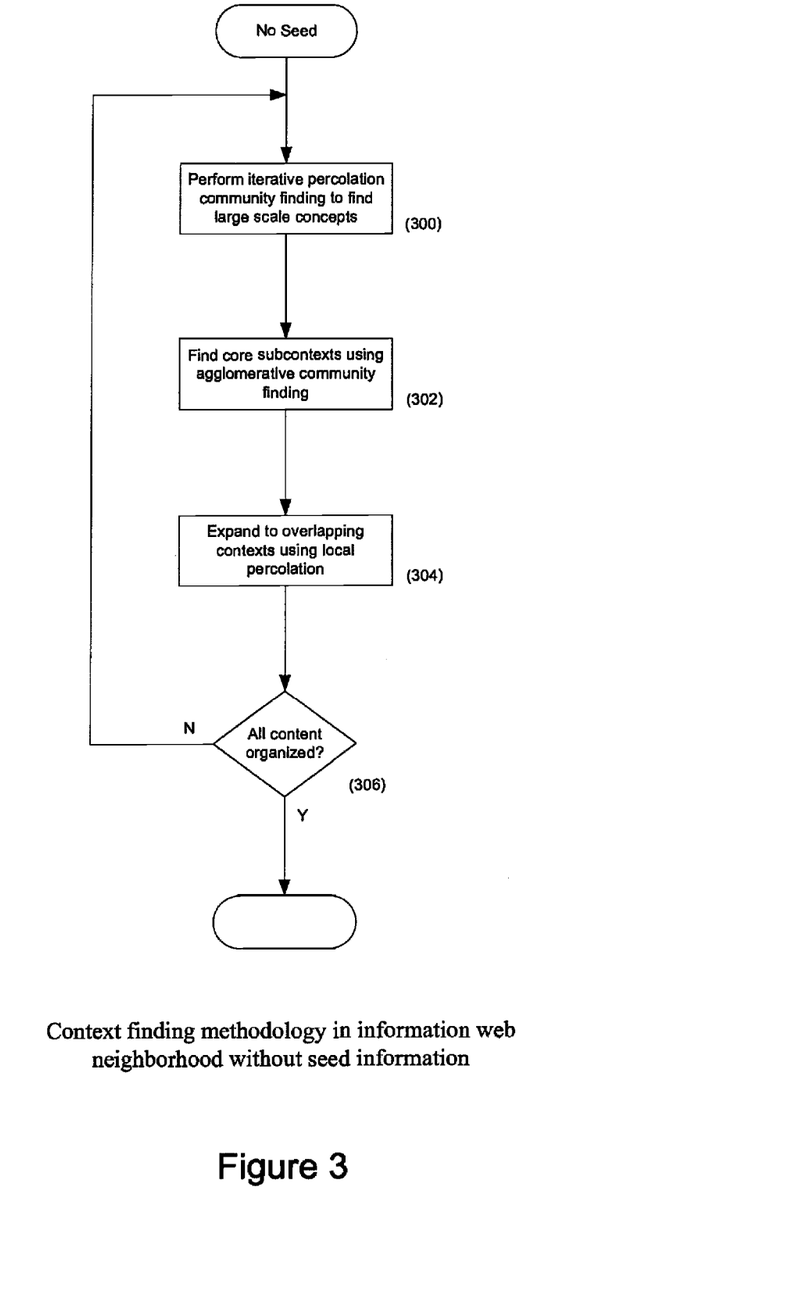
FIG. 3 is a flowchart of a process in one embodiment that determines an information web neighborhood without seed information.

FIG. 3 provides an example of context finding that can be performed on contents related to one or more generated high level informational neighborhoods. Context finding may include a plurality of steps that divide contents into overlapping contexts based on their semantic and structural relevance to a particular topic. The method may include variations of percolation community finding and regular agglomerative community finding at different levels. At different levels, a combination of these methods can be used to generate a hierarchy of overlapping context.

At step 300, large scale contexts can be found using iterative percolation community finding. Percolation community finding provides methods for finding large overlapping communities in a distributed manner. A global community finding as described in U.S. patent application Ser. No. 11/125,329 by Muntz. et al., titled "Method and apparatus for distributed community finding," and filed May 10, 2005 ("the '329 Application"), U.S. Patent Publication No. 2006/0271564, and incorporated herein by reference, can be used to find large scale communities. A combination of percolation community finding (step 300) and agglomerative community finding methods (step 302) can be used to generate sub-contexts at various resolutions. Local percolation can be started from seed nodes at step 304 in order to expand into overlapping contexts. At step 306, these steps and processes may be repeated until the contents are organized as a plurality of overlapping contexts.

Figure 2:
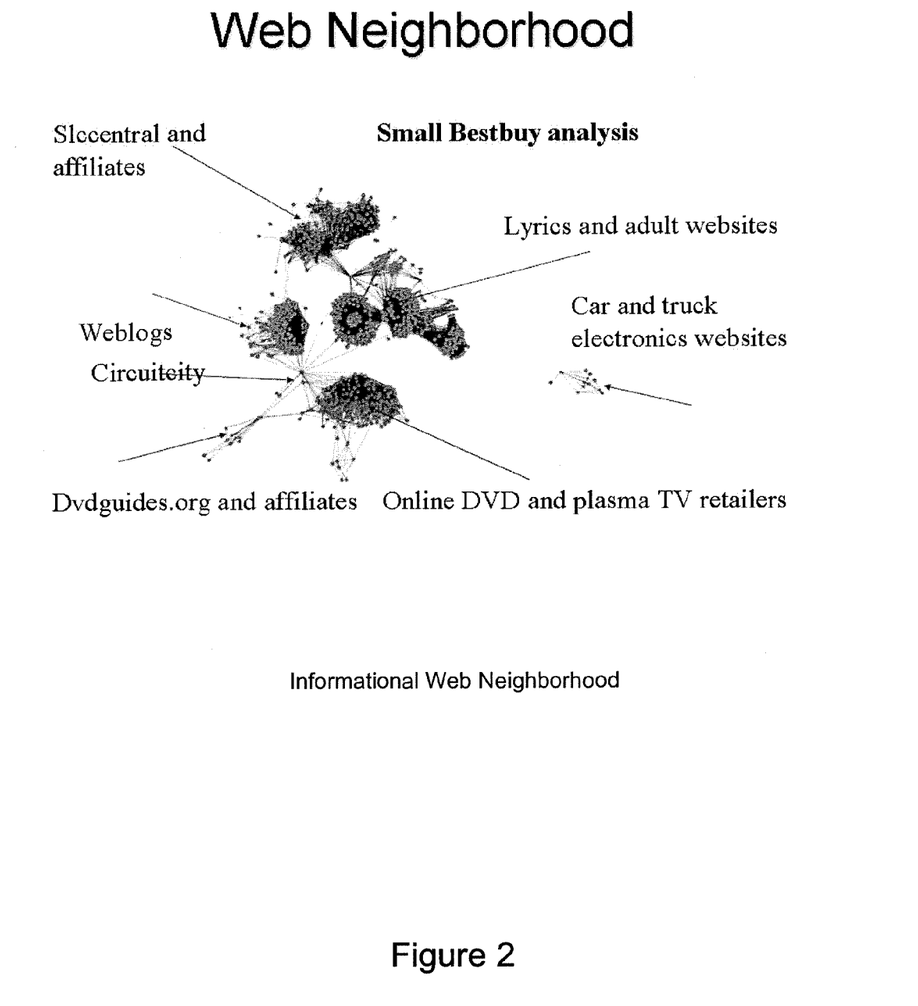
FIG. 2 is an example of a visualized informational web neighborhood.

The diagram of FIG. 2 is a visualization of an informational web-neighborhood in certain embodiments of the invention. In the diagram, the visualized neighborhood starts at the seed information "BestBuy.com." Different contexts and community characterizations are marked on the diagram. Each of the communities can typically be associated with a definite context. In certain embodiments, the neighborhood may identify one or more close competitors of Best Buy; in the example, "Circuit City" might be identified as such a competitor.

In certain embodiments, the methodologies described above can be applied to generate specialized webs including business webs, industry-specific webs and music webs. Seed nodes can be generated using "directory pages" or any available database or data source. For example, specialized and expert databases such as Hoover, Dunn and Bradstreet, and EDGAR (SEC filings) can be used to list all related companies, their products, management teams, financial information, etc. Results obtained from these sources can be parsed to generate categorized data and predefined concepts, which can be used as effective information.

In certain embodiments of the invention, a complete linked-database can be iteratively partitioned into multi-scale and multi-resolution sets of overlapping neighborhoods. Each such structural neighborhood can then be processed to obtain concepts and summaries as described in the '329 Application. The communities and contents may then be reverse indexed to obtain search results for any query.

In one example, methodologies and systems provided in certain embodiments can be used for partitioning pages in the World Wide Web into a set of multi-scale and multi-resolution collections of potentially overlapping neighborhoods and contexts. The neighborhoods can be particularized to selected domains in order to generate domain-specific webs such as business web or a music web. Aspects of the invention provide methodologies for generating information neighborhoods and for automatically providing conceptual characterizations of the information neighborhoods, without any seed information. These contexts can then be used to search and navigate the web at the knowledge level.

In certain embodiments, a multi-resolution and multi-dimensional informational search tool for the web is provided that can be used for informational exploration of the web. Typically, a user provides a set of seed information, comprising key words, initial links, and names of related objects or organizations. This seed information can be processed to generate a set of seed nodes around which the informational neighborhoods are formed and expanded. A multi-resolution and multi-dimensional network of communities of web pages is typically returned, where each community may be labeled with a set of words and concepts and may be embedded in a hierarchical structure. In one example, a query related to a particular drug would typically return a list of web pages including the drug's name in its content, as well as a network, where the information is organized in terms of communities of web pages. Typically, each community is labeled with common concepts and relevancies. In the example, a neighborhood structure may be returned comprising pharmaceutical companies that manufacture the drug and their competitors, Federal Drug Administration (FDA) information about the drug and related medications, drug trials, major institutes at which drug trials were conducted, news releases about the drug, alternate or competing drugs, user evaluations and reports. This informational landscape can then be explored further by the user, such that the user controls the search process.

In certain embodiments, searches performed by individuals can be accumulated and integrated into a common database, so that the informational neighborhoods derived from each query can be used to generate a cumulative informational web neighborhood.

In certain embodiments, partitioning of web pages can be performed in the absence of a user generated query and the entire web can be partitioned into multi-scale, hierarchical sets of overlapping contexts and communities. Partitioning may be accomplished using a combination of percolation crawl and structured community finding algorithms. Communities and contexts can then be indexed, and concepts can be automatically extracted as described, for example, in the '329 Application. Concepts extracted according to the '674 Application can be characterized as patterns of terms. Communities and contents can be inverted indexed whereby the inverted index returns all communities and contents based on a key word or a concept, whereby results are typically sorted according to the relevance scores that "match" a submitted query. Thus, one result of such searching is a rendition of the web in terms of contexts which will include contents that do not directly match the queried for keywords.

In certain embodiments, informational web neighborhoods can be determined and temporal dynamics of the relationships among objects and concepts represented in the informational web neighborhoods can be identified and analyzed. By analyzing archived webs, the informational neighborhoods can be derived at different times and these temporally displaced derivations can be compared to identify significant changes that may have occurred from one period to another. For example, by tracking the structure of the business web, one would be able to identify any major shift in alliances, or the emergence of a new industry or a business sector, or major upheavals in an existing industry or in a particular corporation. Such dynamical analyses can provide both predictive tools for estimating likelihoods of impending shifts in the structure of certain sectors, as well as, investigative research tools to determine potential factors that could have led to a particular set of observed changes.

In certain embodiments, informational web neighborhoods can be combined with temporal traffic, click-through, page view, and other usage information of the WebPages and advertisement or prepaid leads, to analyze the flow of traffic, click-through and optimize the ad and lead generation strategy using different statistical techniques. For example, Best Buy can analyze the traffic incoming from a group or sector of informational neighborhood—such as blogs—to their competitor (Circuit City), and can provide incentives to attract more traffic from this group to Best Buy. Furthermore, measured temporal traffic and other changes in web neighborhoods and communities can be used to analyze the effectiveness of an online advertisement or lead generation campaign and optimize the selection of sectors and WebPages to choose the advertisement or lead generation. where advertisement can be any kind of advertisement, including but not limited to banner ads, CPC ads, text ads, flash ads or any other paid listing and lead generation includes any paid or unpaid in-link to the destination website.

Additional Descriptions of Certain Aspects of the Invention

Certain embodiments of the invention provide a method for determining a domain-specific network neighborhood, comprising generating seed nodes from seed information, and constructing an annotated linked network around the seed nodes, wherein the linked network includes nodes and edges represented by meta-information. In some of these embodiments, the seed nodes delineate the scope of the web neighborhood to be determined. In some of these embodiments, a portion of the seed information is received from a user. In some of these embodiments, the seed information includes one or more names of companies, individuals, organizations competitors. In some of these embodiments, the seed information identifies two or more related industries. In some of these embodiments, the seed information includes key words. In some of these embodiments, the seed information identifies a web site. In some of these embodiments, constructing includes performing percolation crawling. In some of these embodiments, percolation crawling includes the steps of selecting a seed node, following links between the selected seed node and one or more neighboring nodes, and performing semantic analysis of contents of the one or more neighboring nodes. In some of these embodiments, percolation crawling includes determining relevance of the one or more neighboring nodes based on the semantic analysis. In some of these embodiments, percolation crawling includes determining a type of relevance of the one or more neighboring nodes based on the semantic analysis. In some of these embodiments, percolation and local neighborhood crawling includes selectively discarding selected ones of the one or more neighboring nodes based on the relevance and type of relevance of the selected ones. In some of these embodiments, at least one of the links originates at one of the neighboring nodes. In some of these embodiments, seed nodes are automatically derived from an information source. In some of these embodiments, the semantic analysis identifies a plurality of concepts in the one or more neighboring nodes. In some of these embodiments, the plurality of concepts includes concepts identified from patterns of terms in the contents. In some of these embodiments, a plurality of includes predefined concepts associated with certain of the nodes. In some of these embodiments, the step of determining relevance includes matching one or more of the plurality of concepts with a set of concepts associated with the domain-specific network neighborhood.

Certain embodiments of the invention provide a network neighborhood comprising a community including a cluster of related network nodes, and a set of annotated relationships connecting different ones of the related network nodes, wherein the community is assigned a plurality of concepts and each of the related network nodes includes terms associated with at least one of the plurality of concepts. In some of these embodiments, each neighborhood comprises one or more business related entities. In some of these embodiments, certain of the plurality of concepts are assigned using a text mining tool. In some of these embodiments, the text mining tool is a latent semantic indexing tool. In some of these embodiments, the text mining tool is a natural language processing tool. In some of these embodiments, certain of the plurality of concepts are derived from semantic processing of the terms. In some of these embodiments, the text mining tool is a natural language processing tool. In some of these embodiments, the cluster of nodes is related by business sector.

Certain embodiments of the invention provide a method for conducting an informational search, comprising receiving seed information from a user, generating seed nodes from the seed information, and identifying a community of linked network nodes associated with a set of concepts, wherein each node is related to the community by at least one of the set of concepts. In some of these embodiments, the information includes a key word. In some of these embodiments, the information includes an initial link to one of the nodes. In some of these embodiments, the information includes a name. In some of these embodiments, the community is embedded in a hierarchy of communities based on a set terms associated with the community. In some of these embodiments, the community is maintained in a database with one or more other communities. In some of these embodiments, the database is configured to maintain a cumulative informational network neighborhood comprising the community and the one or more other communities. In some of these embodiments, the one or more other communities represent a temporal series of communities obtained by repeating an informational search at intervals over a period of time. Some of these embodiments also comprise analyzing the temporal series of communities to determine changes between communities in the series. In some of these embodiments, the changes are predictive of impending shifts in a business sector. In some of these embodiments, the changes include changes indicative of visitations to the community.

Certain embodiments of the invention provide a computer implemented method, comprising the steps of maintaining an informational network neighborhood including a community of linked network nodes, wherein each node includes one more concepts associated with the community, identifying changes in the informational network neighborhood by repetitively conducting an informational search at desired time intervals, and providing information indicative of activity in the informational network neighborhood. In some of these embodiments, the activity corresponds to visitation of nodes within the community. In some of these embodiments, the activity represents network traffic directed to the community. Some of these embodiments also comprise placing advertisements in one or more of the linked network nodes based on the activity. Some of these embodiments also comprise generating contact lists based on the activity, the contact lists including information derived from one or more of the linked network nodes. In some of these embodiments, the informational network neighborhood includes a plurality of communities. In some of these embodiments, the activity includes network traffic measurements corresponding to visitations to nodes in each of the plurality of communities. Some of these embodiments also comprise placing advertisements in one of the plurality of communities, the one community being selected based on the network traffic measurements. Some of these embodiments also comprise generating contact lists based on the activity, the contact lists including information derived from one of the plurality of communities, the one community being selected based on the network traffic measurements.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. A computer implemented method, the method comprising:
generating seed nodes from seed information, the seed nodes representing one or more web pages, and wherein the one or more web pages comprise one or more reference links;
performing probabilistic percolation crawling from at least one of the seed nodes, wherein performing probabilistic percolation crawling comprises following the one or more reference links in and out of the one or more web pages to one or more neighboring nodes probabilistically, wherein performing percolation crawling further comprises randomly selecting reference links in and out of the web page and in and out of the one or more neighboring nodes, wherein selected reference out-links are added to a linked database when the link satisfies a first probability and selected reference in-links are added to the linked database when the link satisfies a second probability;
generating a structural web community neighborhood based on the percolation crawling from the at least one of the seed nodes by iteratively partitioning the linked database into overlapping communities, the structured web community neighborhood comprising a plurality of communities of network nodes linked by edges around the one of the seed nodes, each of the plurality of communities comprising a set of network nodes that are more linked amongst themselves than to network nodes that are not included in the community;
annotating each of the plurality of communities of network nodes in the structural web community with a concept; and
storing the annotated structural web neighborhood.

2. The method of claim 1 wherein a portion of the seed information is received from a user.

3. The method of claim 1 wherein the seed information comprises one or more names of companies, individuals and organizations competitors.

4. The method of claim 1 wherein the seed information identifies two or more related industries.

5. The method of claim 1 wherein the seed information comprises key words.

6. The method of claim 1 wherein the seed information identifies a web site.

7. The method of claim 1 further comprising:
performing semantic analysis of contents of the one or more neighboring nodes.

8. The method of claim 7 further comprising determining relevance of the one or more neighboring nodes based at least in part on the semantic analysis.

9. The method of claim 8 further comprising determining a type of relevance of the one or more neighboring nodes based at least in part on the semantic analysis.

10. The method of claim 9 further comprising selectively discarding selected ones of the one or more neighboring nodes based on the relevance and type of relevance of the selected ones.

11. The method of claim 8 wherein the semantic analysis identifies a plurality of concepts in the one or more network nodes.

12. The method of claim 11 wherein the plurality of concepts comprises concepts identified from patterns of terms in the contents of the one or more network nodes.

13. The method of claim 11 wherein the plurality of concepts comprises predefined concepts associated with certain of the nodes.

14. The method of claim 11, wherein relevance is determined by matching one or more of the plurality of concepts with a set of concepts associated with the structural web community neighborhood.

15. The method of claim 1 wherein at least one of the links originates at one of the neighboring nodes.

16. The method of claim 1 wherein the seed node is automatically derived from an information source.

17. The method of claim 1, further comprising:
performing a semantic analysis to determine a relevance of a network node to at least one other network node; and
if the relevance of the network node exceeds a threshold, associating the network node with the at least one other network node to form one of the plurality of communities.

18. An informational network neighborhood comprising:
a memory configured to store a representation of:
a structured web community neighborhood within a network of linked nodes, the structured web community neighborhood comprising a plurality of communities of network nodes linked by edges around a seed node, and wherein the seed node and the set of network nodes comprise one or more reference links, each of the plurality of communities comprising a set of network nodes that are more linked amongst themselves than to network nodes that are not included in the community based on an analysis of the one or more reference links of the seed node and the set of network nodes, and
a set of annotations identifying concepts of the plurality of communities of the structured web community neighborhood; and
a processor configured to perform probabilistic percolation crawling to construct the structured web community neighborhood, wherein performing probabilistic percolation crawling comprises following the one or more reference links in and out of the one or more web pages to one or more network nodes probabilistically, wherein performing percolation crawling further comprises randomly selecting reference links in and out of the web page and in and out of the one or more neighboring nodes, wherein selected reference out-links are added to a linked database when the link satisfies a first probability and selected reference in-links are added to the linked database when the link satisfies a second probability,
the processor further configured to generate the structural web community based on the percolation crawling by iteratively partitioning the linked database into overlapping communities,
the processor further configured to assign a concept to each community identified in the probabilistic percolation crawling based at least in part on a semantic analysis of the community.

19. The informational network neighborhood of claim 18 wherein each neighborhood comprises one or more business related entities.

20. The informational network neighborhood of claim 18 wherein certain of the plurality of concepts is assigned using a text mining tool.

21. The informational network neighborhood of claim 20 wherein the text mining tool comprises a latent semantic indexing tool.

22. The informational network neighborhood of claim 20 wherein the text mining tool is a natural language processing tool.

23. The informational network neighborhood of claim 20, wherein the text mining tool is a natural language processing tool.

24. The informational network neighborhood of claim 20 wherein the network nodes in a community are related by business sector.

25. The informational network neighborhood of claim 18 wherein certain of the plurality of concepts are derived from semantic processing of terms in the network nodes.

26. A computer implemented method for conducting an informational search, the method comprising:
receiving seed information, the structured web community neighborhood comprising a set of nodes that are more linked amongst themselves than to nodes in the network that are not included in the structured web community neighborhood;
storing the seed information in a memory;
generating seed nodes from the seed information, each of the seed nodes representing one or more web pages, and wherein the one or more web pages comprise one or more reference links;
identifying a community of linked network nodes associated with a set of concepts using probabilistic percolation crawling from one of the seed nodes, wherein performing probabilistic percolation crawling comprises following the one or more reference links in and out of the one or more web pages to one or more neighboring nodes probablistically, wherein performing percolation crawling further comprises randomly selecting reference links in and out of the web page and in and out of the one or more neighboring nodes, wherein selected reference out-links are added to the community when the link satisfies a first probability and selected reference in-links are added to the community when the link satisfies a second probability and wherein each node is related to the community by at least one of the set of concepts; and
annotating each of the plurality of communities of network nodes in the structural web community with a concept.

27. The method of claim 26 wherein the seed information comprises a key word.

28. The method of claim 26 wherein the seed information comprises an initial link to one of the nodes.

29. The method of claim 26 wherein the seed information comprises a name.

30. The method of claim 26 wherein the community is embedded in a hierarchy of communities based on a set terms associated with the community.

31. The method of claim 26 wherein the community is maintained in a database with one or more other communities.

32. The method of claim 31 wherein the database is configured to maintain a cumulative informational network neighborhood comprising the community and the one or more other communities.

33. The method of claim 31 wherein the one or more other communities represent a temporal series of communities obtained by repeating an informational search at intervals over a period of time.

34. The method of claim 33, further comprising analyzing the temporal series of communities to determine changes between communities in the series.

35. The method of claim 34 further comprising analyzing the changes to predict impending shifts in a business sector.

36. The method of claim 34 wherein the changes comprise changes indicative of visitations to the community.

37. The method of claim 26, further comprising:
performing a semantic analysis to determine a relevance of a network node to at least one other network node; and
if the relevance of the network node exceeds a threshold, associating the network node with the at least one other network node to form one of the plurality of communities.

38. A computer implemented method, the method comprising:
repetitively conducting probabilistic percolation crawling at desired time intervals to generate informational network neighborhoods at the desired time intervals, the informational network neighborhood including a community of network nodes linked by referenced links, wherein conducting probabilistic percolation crawling comprises following the one or more reference links in and out of the one or more web pages to one or more neighboring nodes probablistically, wherein performing percolation crawling further comprises randomly selecting reference links in and out of the web page and in and out of the one or more neighboring nodes, wherein selected reference out-links are added to the network neighborhood when the link satisfies a first probability and selected reference in-links are added to the network neighborhood when the link satisfies a second probability, and wherein the communities of network nodes are determined by iteratively partitioning the network neighborhood, wherein each network node includes at least one concept associated with the community, the community comprising a set of network nodes that are more linked amongst themselves than to network nodes that are not included in the community based on the probabilistic percolation crawling;
maintaining a representation of the informational network neighborhoods at the desired time intervals in a memory; and
identifying changes in the informational network neighborhood by comparing at least two of the informational network neighborhoods maintained in the memory.

39. The method of claim 38 wherein the changes correspond to visitation of nodes within the community.

40. The method of claim 38 wherein the changes represent network traffic directed to the community.

41. The method of claim 40, further comprising placing advertisements in one or more of the linked network nodes based on the changes.

42. The method of claim 40, further comprising generating one or more contact lists based on the changes, the one or more contact lists including information derived from one or more of the linked network nodes.

43. The method of claim 38 wherein the informational network neighborhood comprises a plurality of communities.

44. The method of claim 43 wherein the changes comprise network traffic measurements corresponding to visitations to nodes in each of the plurality of communities.

45. The method of claim 44, further comprising placing advertisements in one of the plurality of communities, the one community being selected based on the network traffic measurements.

46. The method of claim 44, further comprising generating contact lists based on the changes, the contact lists including information derived from one of the plurality of communities, the one community being selected based on the network traffic measurements.

47. A computer implemented method, the method comprising:
generating seed nodes from seed information, the seed nodes representing one or more web pages;
performing probabilistic percolation crawling from each of the seed nodes, wherein performing percolation crawling comprises randomly selecting reference links in and out of the web page and in and out of the one or more neighboring nodes, wherein selected reference out-links are added to a linked database when the link satisfies a first probability and selected reference in-links are added to the linked database when the link satisfies a second probability;
constructing a structured web community neighborhood based on the probabilistic percolation crawling from each of the seed nodes, the structured web community neighborhood comprising a plurality of communities of network nodes linked by edges around the one of the seed nodes, each of the plurality of communities comprising a set of network nodes that are more linked amongst themselves than to network nodes that are not included in the community, wherein constructing the structured web community neighborhood comprises performing a structural analysis of the seed nodes and the network nodes based on the percolation crawling to identify the edges and determine the set of network nodes that are more linked amongst themselves than to network nodes that are not included in the community;
performing a semantic analysis of each of the plurality of communities;
annotating each of the plurality of communities of network nodes with a concept based on the semantic analysis; and
storing the annotated structured web community neighborhood.

* * * * *